March 17, 1953  F. E. CARTER  2,631,577
VALVE SEAT ASSEMBLY
Filed May 17, 1952

FRANKLIN E. CARTER
*INVENTOR.*
BY
*Attorney*

Patented Mar. 17, 1953

2,631,577

UNITED STATES PATENT OFFICE 2,631,577

VALVE SEAT ASSEMBLY

Franklin E. Carter, East Aurora, N. Y., assignor to Worthington Corporation, a corporation of Delaware Application May 17, 1952, Serial No. 288,466

2 Claims. (Cl. 123—188)

This invention relates to valve seat assemblies for internal combustion engines employing poppet valves for controlling entrance of intake air and the exhaust gas release from the engine cylinders.

With the present trend of engine manufacture to extract greater horsepower from given cylinder sizes of internal combustion engines, the weight and temperature of the exhaust gases becomes larger in proportion to the load, while higher rotative speeds mean more working valve cycles and higher exhaust gas velocities, with the result that it is necessary to provide replaceable valve seats to avoid the more costly expense of new cylinder heads when valve seat wear takes place.

The use of valve seat inserts has been resorted to to solve the problem. However, conditions met with in installing such inserts and in operating conditions of the engine have rendered such valve seat structures heretofore employed, unsatisfactory.

It is essential for successful performance of any valve seat insert to provide intimate contact with the cylinder head or cylinder material of the engine. This assures, adequate heat transfer to the jacket water. The most common type of installation is to provide an interference fit between the cylinder head or cylinder and the valve seat insert. Insufficient interference results in the insert dropping out during service and causing considerable damage to the running gear of the engine. Using too great an interference will overstress the valve insert material beyond its elastic limit resulting in a loss of interference due to permanent deformation of the valve insert. The amount of interference also determines the magnitude of tensile stress in the area of the cylinder head or cylinder surrounding the valve seat insert. Greater expansion can be expected in the valve seat insert because it operates at higher temperature than the temperature of the surrounding cylinder head or cylinder, a condition produced by the poorer rate of heat transfer across the insert joint to the cylinder head.

The summation of these three stresses plus the normal working stress will produce tensile stresses in the cylinder head of sufficient magnitude to frequently exceed the ultimate strength of the material. Cracking of the cylinder head deck material results and progression of these cracks to the water jacket requires the replacement of the cylinder head or where the valve seat is inserted in the cylinder of the engine, as is done in some constructions, the progression of cracks may require replacement of the cylinder.

The object of the present invention is to produce a novel valve seat insert which will eliminate the damaging effects of the mechanical stresses above referred to, will achieve all the benefits of increased valve seat life and will eliminate the detrimental features of dropping out, over-stressing the cylinder head and the difficulties of replacement of a shrunk in insert.

More specifically, the present invention comprehends a valve seat insert which is machined with a designed clearance in relation to the cylinder head or cylinder counterbore when cold such that when the internal combustion engine is in operation resultant heating of the valve seat insert will cause it to expand and firmly contact the counterbore without causing any undue stressing of the surrounding material, and which insert is held firmly in place prior to expansion by means of an expansion ring or piston ring which engages the insert and cylinder head or cylinder in such manner as to urge the insert firmly against the inner end of the counterbore.

With these and other objects in view, as may appear from the accompanying specification, the invention consists of various features of construction and combination of parts, which will be first described in connection with the accompanying drawings, showing a valve seat assembly of a preferred form embodying the invention, and the features forming the invention will be specifically pointed out in the claims.

Figure 1:
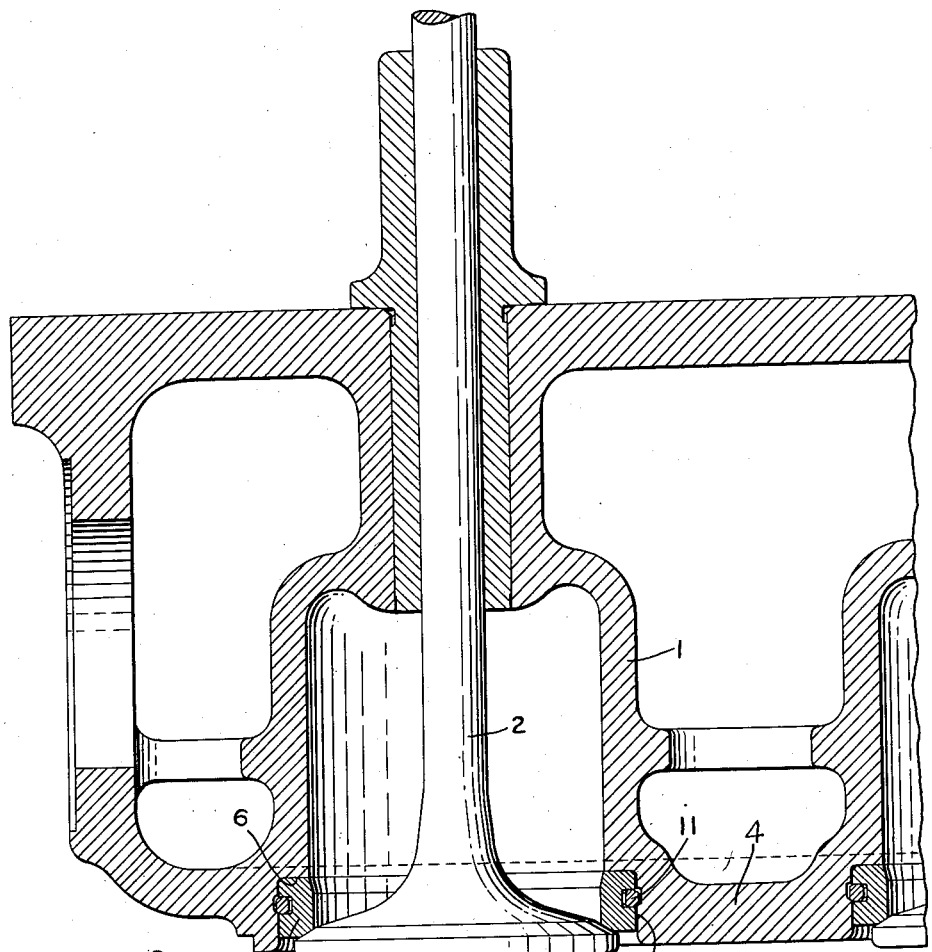
Figure 1 is a fragmentary section through the cylinder head of an internal combustion engine showing the improved valve seat insert in place.

Referring more particularly to the drawing, 1 indicates a section of the cylinder head of an internal combustion engine employing poppet valves, one of which is shown at 2 to control the entrance of intake air and the exhaust gas released from the engine cylinders. As previously pointed out hereinabove, it is necessary, to save the expense of frequent new cylinder heads, to provide valve seat inserts against which the poppet valves 2 seat, which inserts are made of various types of metal having greater resistance to wear than the metal of which the cylinder head 1 is formed. When the engine is in operation, the temperature of the valve seat ring will always be higher than the temperature of the cylinder head or cylinder into which it fits, because most of the cooling of the valve seat ring is by conduction to the cylinder head or cylinder in which it fits, and therefore the valve seat ring will have a greater degree of expansion than the cylinder head or cylinder. The present invention takes advantage of this condition to provide a valve seat insert which while being firmly held in position during operation of the engine may be removed with comparative ease after the engine cools down, for purpose of replacement of the insert and also to provide an insert which will eliminate the undesirable stresses normally effecting a cylinder head or cylinder in usual construction of approved valve seat inserts.

As shown in the drawings the cylinder head 1 is provided with a counterbore 3 surrounding the valve port and opening out through the face of the valve deck 4 of the cylinder head and annular groove 5 is cut into the wall of the counterbore 3 intermediate the outer open end of the counterbore and the inner end 6. The outer end of the annular groove 3 is beveled as shown at 7 for the purpose hereinafter described.

Figure 3:
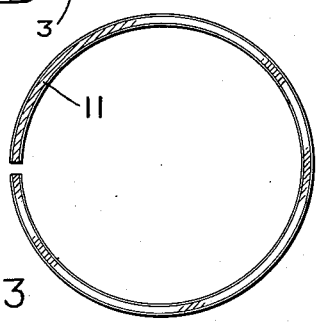
Figure 3 is a plan view of the expansion or piston ring employed in holding the insert in place until expansion thereof is provided by heat during operation of the engine.

The valve seat insert 8 is a continuous annular ring having the valve seat 9 formed thereon and provided with an annular groove 10 therein intermediate its ends which receives a spring expansion ring 11. The spring expansion ring 11 may be an ordinary piston ring such as used in the pistons of internal combustion engines, being a split spring ring as shown in Figure 3 of the drawings. The ring 11 has its edges beveled as shown at 12 for cooperation with the beveled outer end of the annular groove 5 so that when the insert 8 is placed in the counterbore 3 and the spring expansion ring 11 snaps into the annular groove 5 the engagement of the beveled edges will urge the valve seat insert inwardly against the inner end 6 of the counterbore 3 and will firmly hold the valve seat insert in position in the counterbore.

Figure 2:
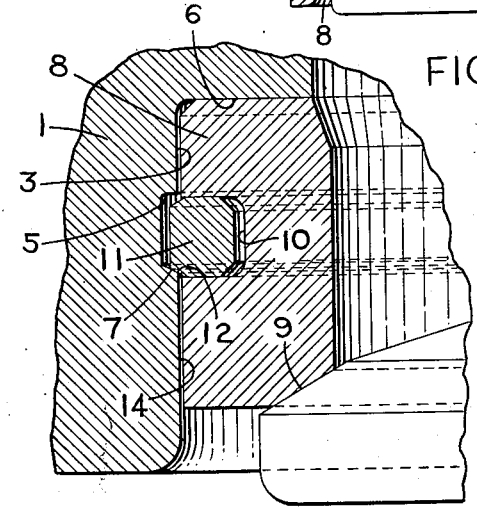
Figure 2 is an enlarged fragmentary view illustrating the feature of the clearance between the valve seat insert and the wall of the counterbore in the engine cylinder head.

To prevent the administering of undesirable stresses to the material of the cylinder head 1 when the valve seat insert expands when heated during operation of the engine, the valve seat insert is machined with a designed clearance in relation to the cylinder head counterbore so as to provide the clearance space between the outer diameter of the insert and the inner wall of the counterbore as shown clearly at 14 in Figure 2 of the drawings. In other words, the outer diameter of the valve seat insert 8 is less than the diameter of the counterbore 3 so as to provide a clearance space to permit expansion of the valve seat insert without administering damaging mechanical stresses as hereinabove referred to to the cylinder head. Then also, the clearance 14 facilitates the removal of the valve seat insert after it has been worn to such an extent to require replacement in that the cooling of the insert after shutdown of the engine will release the grip of the insert on the cylinder head.

It is to be understood, of course, that the clearance 14 is accurately determined so that when the valve seat insert heats up during operation of the engine it will expand sufficiently to form a firm contact with the wall of the counterbore 3.

While in the drawings and in the above specific description the valve seat insert is shown inserted in the cylinder head of an internal combustion engine, it is to be understood that the present invention embraces constructions wherein the valve seat insert is inserted in the cylinder of an engine, and in the claims the use of the word cylinder is to be understood to embrace either the cylinder proper or its part, a cylinder head.

It will be understood that the invention is not to be limited to the specific construction or arrangement of parts shown, but that they may be widely modified within the invention defined by the claims.

What is claimed is:

1. In combination with a cylinder of an internal combustion engine having a valve port and a counterbore portion about the valve port to receive a valve seat insert, a metal valve seat insert seated in said counterbore, said insert having an annular groove therein, said cylinder having an annular groove therein surrounding and intermediate the ends of said counterbore, a split expansion ring in the annular groove in the insert and engaging in the annular groove in the cylinder, the outer edge of the groove in the cylinder being beveled and said expansion ring having a beveled surface thereon for engagement with the beveled edge of the groove to force said insert firmly against the inner end of the counterbore.

2. In combination with a cylinder of an internal combustion engine having a valve port and a counterbore portion about the valve port to receive a valve seat insert, a metal valve seat insert seated in said counterbore, said insert having an annular groove therein, said cylinder having an annular groove therein surrounding and intermediate the ends of said counterbore, a split expansion ring in the annular groove in the insert and engaging in the annular groove in the cylinder, the outer edge of the groove in the cylinder being beveled and said expansion ring having a beveled surface thereon for engagement with the beveled edge of the groove to force said insert firmly against the inner end of the counterbore, said insert being of smaller exterior diameter than the diameter of the counterbore to permit expansion of the insert during operation of the engine to provide firm contact of the insert and cylinder without causing undue stress on the surrounding metal of the engine cylinder.

FRANKLIN E. CARTER.

REFERENCES CITED

The following references are of record in the file of this patent:

UNITED STATES PATENTS

| Number | Name | Date |
| --- | --- | --- |
| 2,424,738 | Bronander | July 29, 1947 |